United States Patent
Guo et al.

(10) Patent No.: US 9,886,913 B2
(45) Date of Patent: Feb. 6, 2018

(54) LED BACKLIGHT COLOR TEMPERATURE ADJUSTMENT CIRCUIT AND DISPLAY DEVICE HAVING THE SAME

(71) Applicant: Wuhan China Star Optoelectronics Technology Co., Ltd., Wuhan, Hubei (CN)

(72) Inventors: Xingling Guo, Guangdong (CN); Jinjie Zhou, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 187 days.

(21) Appl. No.: 14/909,113

(22) PCT Filed: Jan. 6, 2016

(86) PCT No.: PCT/CN2016/070241
§ 371 (c)(1),
(2) Date: Jan. 30, 2016

(87) PCT Pub. No.: WO2017/096684
PCT Pub. Date: Jun. 15, 2017

(65) Prior Publication Data
US 2017/0278464 A1    Sep. 28, 2017

(30) Foreign Application Priority Data

Dec. 10, 2015 (CN) .......................... 2015 1 0915529

(51) Int. Cl.
*G09G 3/34* (2006.01)
(52) U.S. Cl.
CPC ... *G09G 3/3413* (2013.01); *G09G 2320/0666* (2013.01)

(58) Field of Classification Search
CPC .. G09G 3/2011; G09G 3/2081; G09G 3/3426; G09G 5/06; G02F 2001/133613
See application file for complete search history.

(56) References Cited

U.S. PATENT DOCUMENTS

| 7,330,225 B2 | 2/2008 | Yamaguchi |
| 2007/0291198 A1 | 12/2007 | Shen |

(Continued)

FOREIGN PATENT DOCUMENTS

| CN | 101206839 A | 6/2008 |
| CN | 101315750 A | 12/2008 |

(Continued)

*Primary Examiner* — Shaheda Abdin
(74) *Attorney, Agent, or Firm* — Andrew C. Cheng

(57) ABSTRACT

The present invention provides an LED backlight color temperature adjustment circuit, including a driving chip, an LED backlight module and a control module. The driving chip includes: a driving unit, employed to drive a display panel to show an image; an image data extraction unit, extracting a present display image data of the display panel; an image data analysis unit, employed to calculate a deviation value of the color temperature of the present display image data and a standard color temperature; and a color temperature adjustment unit, employed to generate and output a color temperature adjustment according to the deviation value of the color temperature of the present display image data and the standard color temperature. The LED backlight module includes a plurality of first LEDs which are identical and coupled in series and a plurality of first LEDs which are identical and coupled in series.

20 Claims, 3 Drawing Sheets

(56) References Cited

U.S. PATENT DOCUMENTS

| | | | |
|---|---|---|---|
| 2008/0170063 A1 | 7/2008 | Ryu | |
| 2008/0266329 A1 | 10/2008 | Park et al. | |
| 2009/0021178 A1* | 1/2009 | Furukawa | G09G 3/3413 |
| | | | 315/250 |
| 2009/0174638 A1* | 7/2009 | Brown Elliott | G02F 1/133621 |
| | | | 345/88 |
| 2010/0289811 A1 | 11/2010 | Chen | |
| 2012/0313979 A1* | 12/2012 | Matsuura | G09G 3/3413 |
| | | | 345/690 |
| 2014/0327709 A1 | 11/2014 | Hack et al. | |

FOREIGN PATENT DOCUMENTS

| | | |
|---|---|---|
| CN | 101425284 B | 8/2010 |
| CN | 201582601 U | 9/2010 |
| CN | 101876409 A | 11/2010 |
| CN | 101996587 A | 3/2011 |
| CN | 102420996 A | 4/2012 |
| CN | 103718650 A | 4/2014 |

\* cited by examiner

LED BACKLIGHT COLOR TEMPERATURE ADJUSTMENT CIRCUIT AND DISPLAY DEVICE HAVING THE SAME

CROSS REFERENCE

This application claims the priority of Chinese Patent Application No. 201510915529.0, entitled "LED backlight color temperature adjustment circuit and display device having the same", filed on Dec. 10, 2015, the disclosure of which is incorporated herein by reference in its entirety.

FIELD OF THE INVENTION

The present invention relates to a display technology field, and more particularly to an LED backlight color temperature adjustment circuit and a display device having the same.

BACKGROUND OF THE INVENTION

In traditional liquid crystal technology, each pixel dot is consisted of sub pixels of three colors, red/green/blue (R/G/B). However, the RGBW technology is to add the white (W) sub pixel on the basis of R/G/B. Namely, the RGBW liquid crystal panel has sub pixels of four colors. The benefit after addition of one W sub pixel is that the image will brighter as showing the image, and the image color will be more vivid.

The corresponding color resists act as RGB sub pixels, and the transparent filling up material acts as W sub pixel. The effects of the three colors, red, green, blue shown by the liquid crystal panel are respectively determined with the RGB, three kinds of color resists and the backlight. The white effect shown by the liquid crystal panel is determined with two kinds of conditions. One is the red, green, blue color resists+the backlight, and the other is the transparent filling up material+the backlight. As designing products, the NTSC of the liquid crystal panel, and the color temperature of the liquid crystal panel and the white dot color coordinate are considered. However, the color temperature and the white dot of the red, green, blue color resists+the backlight are not equal to the color temperature and the white dot of the OC+the backlight. Consequently, the color temperature of the designed and produced liquid crystal panel has significant difference from the color temperature in the beginning of the design to result in the condition of color temperature and white dot color coordinate drifts and to result in the poor color performance of the liquid crystal panel.

SUMMARY OF THE INVENTION

An objective of the present invention is to provide an LED backlight color temperature adjustment circuit for solving the technical issue of the poor color performance of the liquid crystal panel according to prior art.

The present invention provides an LED backlight color temperature adjustment circuit, comprising:

a driving chip, comprising:

a driving unit, employed to drive a display panel to show an image;

an image data extraction unit, extracting a present display image data of the display panel;

an image data analysis unit, employed to determine a color temperature of the present display image data, and to calculate a deviation value of the color temperature of the present display image data and a standard color temperature; and a color temperature adjustment unit, employed to generate and output a color temperature adjustment according to the deviation value of the color temperature of the present display image data and the standard color temperature;

an LED backlight module, comprising:

a first LED backlight unit, comprising a plurality of first LEDs which are identical and coupled in series; and a second LED backlight unit, comprising a plurality of second LEDs which are identical and coupled in series, and a color temperature of the second LEDs is different from a color temperature of the first LEDs;

a control module, electrically coupled to the driving chip and the LED backlight module, and employed to adjust driving currents of the first LEDs and the second LEDs according to the color temperature adjustment signal for adjusting a color temperature of the LED backlight module.

The image data analysis unit calculates a gray scale average value of red sub pixels and a gray scale average value of blue sub pixels in the present display image, and determines the color temperature of the present display image according to the gray scale average value of red sub pixels and the gray scale average value of blue sub pixels.

The plurality of first LEDs and the plurality of second LEDs are alternately located and linearly aligned.

The plurality of first LEDs and the plurality of second LEDs are aligned in an array, and are alternately located both in a row direction and in a column direction of the array.

The plurality of first LEDs and the plurality of second LEDs are merely aligned in one column.

The control module comprises an I2C interface unit, a programmable resistance array and a control unit; the I2C interface unit is employed to communicate with the driving chip to receive the color temperature adjustment signal; the programmable resistance array comprises a first resistance array and a second resistance array, and the first resistance array and the second resistance array are respectively coupled with the first LED backlight unit and the second LED backlight unit in series; the control unit is employed to control the values of the first resistance array and the second resistance array according to the color temperature adjustment signal to correspondingly adjust the driving currents of the first LEDs and the second LEDs for correspondingly controlling brightnesses of the first LEDs and the second LEDs.

The first resistance array comprises a plurality of resistances located in parallel, and one end of a parallel circuit consisted of the plurality of resistances is grounded, and the other end is electrically coupled to a cathode of the first LED backlight unit; an anode of the first LED backlight unit is electrically coupled to a driving voltage.

The control module comprises an I2C interface unit, a first variable resistance, a second variable resistance and a control unit; the I2C interface unit is employed to communicate with the driving chip to receive the color temperature adjustment signal; the first variable resistance and the second variable resistance are respectively coupled to the first LED backlight unit and the second backlight unit in series; the control unit is employed to control resistance values of the first variable resistance and the second variable resistance according to the color temperature adjustment signal to correspondingly adjust the driving currents of the first LEDs and the second LEDs for correspondingly controlling brightnesses of the first LEDs and the second LEDs.

The image data extraction unit is a buffer.

The present invention further provides a display device, comprising a display panel and the LED backlight color temperature adjustment circuit.

The LED backlight color temperature adjustment circuit controls the driving currents of the first LEDs and the second LEDs with different color temperatures according to the deviation value of the color temperature of the present display image data and the standard color temperature. The color temperature of the LED backlight module can be adjusted to automatically adjust color temperature as showing the pictures of different color temperatures, and thus to promote the color performance of the display panel.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The present invention provides an LED backlight color temperature adjustment circuit, which can be applied to the electronic apparatuses with display panels. The present invention provides a chip structure on a flexible board, which can be applied to the electronic apparatuses with display panels, such as the cellular phone, the tablet, the notebook, the liquid crystal display, the liquid crystal television and the digital camera. In this embodiment, the application in the liquid crystal panel is illustrate for explaining the benefits of the present invention.

Figure 1:
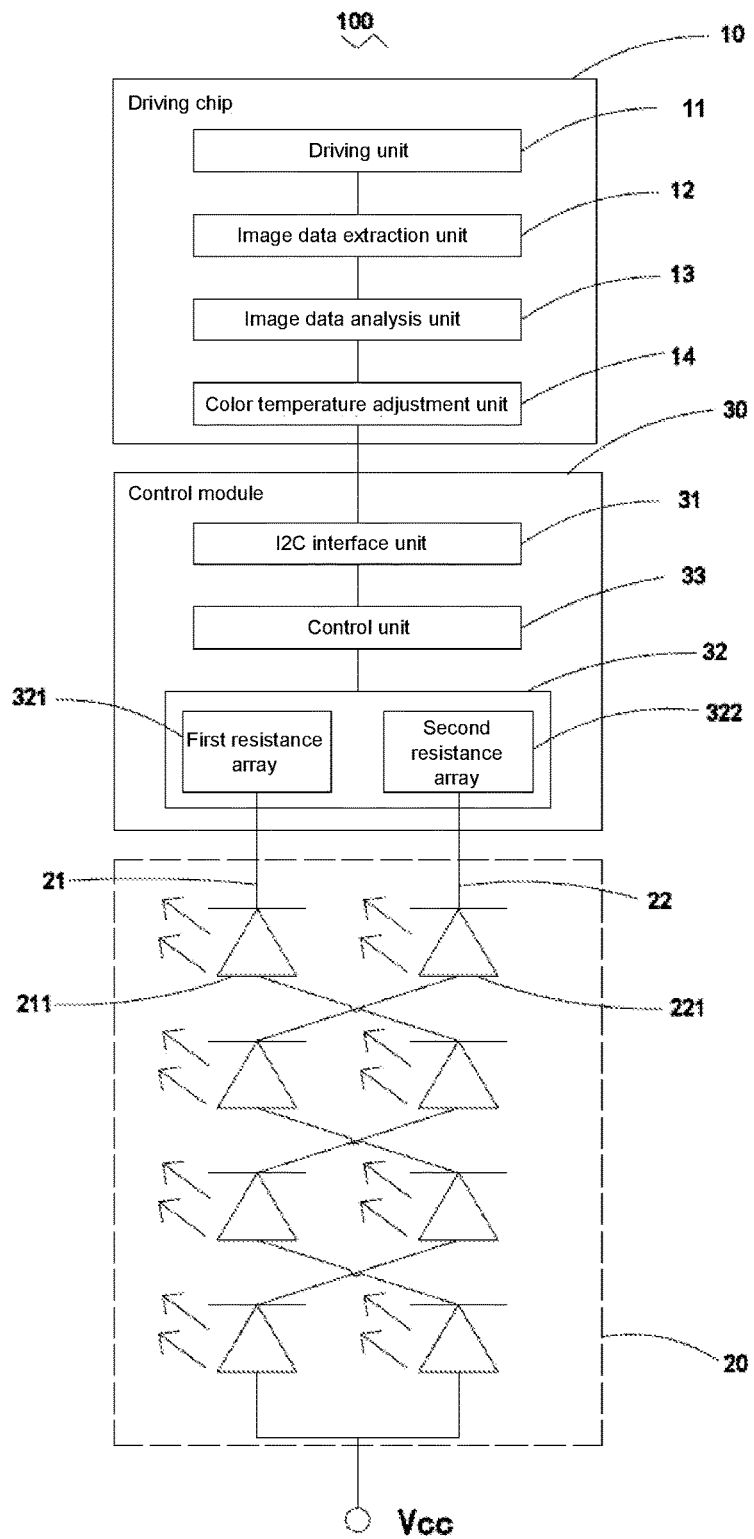
FIG. 1 is functional block diagram of an LED backlight color temperature adjustment circuit according to the preferred embodiment of the present invention.

Please refer to FIG. 1. The LED backlight color temperature adjustment circuit 100 provided by the preferred embodiment of the present invention comprises a chip 10, an LED backlight module 20 and a control module 30 electrically coupled to the chip 10 and the LED backlight module 20. The driving chip 10 comprises a driving unit 11, an image data extraction unit 12, an image data extraction unit 13 and a color temperature adjustment unit 14.

The driving unit 11 is employed to drive a display panel to show an image.

The image data extraction unit 12 is employed to extract a present display image data of the display panel. The present display image data of the display panel at least comprises data of a red (R) sub pixel, a green (G) sub pixel, a blue (B) sub pixel and a white (W) sub pixel. In this embodiment, the image data extraction unit 12 can be a buffer.

The image data analysis unit 13 is employed to determine a color temperature of the present display image data, and to calculate a deviation value of the color temperature of the present display image data and a standard color temperature.

Specifically, the image data analysis unit 13 calculates a gray scale average value of red (R) sub pixels and a gray scale average value of blue (B) sub pixels in the present display image, and determines the color temperature of the present display image according to the gray scale average value of red (R) sub pixels and the gray scale average value of blue (B) sub pixels.

The color temperature adjustment unit 14 is employed to generate and output a color temperature adjustment to the control module 30 according to the deviation value of the color temperature of the present display image data and the standard color temperature.

The LED backlight module 20 comprises a first LED backlight unit 21 and a second LED backlight unit 22. The first LED backlight unit 21 comprises a plurality of first LEDs 211 which are identical and coupled in series; the second LED backlight unit 22 comprises a plurality of second LEDs 221 which are identical and coupled in series, and a color temperature of the first LEDs 211 is different from a color temperature of the second LEDs 221. The plurality of first LEDs 211 and the plurality of second LEDs 221 are alternately located and linearly aligned. In this embodiment, the plurality of first LEDs 211 and the plurality of second LEDs 221 are aligned in an array, and are alternately located both in a row direction and in a column direction of the array. For instance, as shown in FIG. 1, both the amounts of the first LEDs 211 and the second LEDs 221 are 4, which commonly aligned in a 4×2 array, and the plurality of first LEDs 211 and the plurality of second LEDs 221 are alternately located both in the row direction and in the column direction of the array.

It is understood that in other embodiments, the plurality of first LEDs 211 and the plurality of second LEDs 221 can be merely aligned in one column.

The control module 30 is employed to adjust the driving current of the LED backlight module 20 according to the color temperature adjustment signal, and thus to adjust the color temperature of the LED backlight module 20. Specifically, in this embodiment, the control module 30 comprises an I2C interface unit 31, a programmable resistance array 32 and a control unit 33. The I2C interface unit 31 is employed to communicate with the driving chip 10 to receive the color temperature adjustment signal. The programmable resistance array 32 comprises a first resistance array 321 and a second resistance array 322. The first resistance array 321 and the second resistance array 322 are respectively coupled with the first LED backlight unit 21 and the second LED backlight unit 22 in series. The control unit 33 is electrically coupled to the I2C interface unit 31 and the programmable resistance array 32, and is employed to control the values of the first resistance array 321 and the second resistance array 322 according to the color temperature adjustment signal to correspondingly adjust the driving currents of the first LED backlight unit 21 and the second LED backlight unit 22 for correspondingly controlling brightnesses of the first LEDs 211 and the second LEDs 221. The color temperatures of the first LEDs 211 and the second LEDs 221 will correspondingly increases or decreases along with the increase or decrease of the brightness. Because the first LEDs 211 and the second LEDs 221 have different color temperatures, by properly controlling the brightnesses of the first LEDs 211 and the second LEDs 221, the objective of adjusting the color temperature of the LED backlight module 20 can be achieved. For instance, as the color temperature for display of the LED backlight module 20 requires to be raised, the current value of the LEDs with high color temperature in the first LEDs 211 and the second LEDs 221 can be raised; as the color temperature for display of the LED backlight module 20 requires to be lowered, the current value of the LEDs with low color temperature in the first LEDs 211 and the second LEDs 221 can be raised. It is understood that for adjusting the color temperature in condition that the whole brightness of the LED backlight module 20 is unchanged, as the color temperature for display of the LED backlight module 20 requires to be raised, the current value of the LEDs with high color temperature in the first LEDs 211 and the second LEDs 221 can be raised, and meanwhile, the current value of the LEDs with low color temperature is lowered; as the color temperature for display of the LED backlight module 20 requires to be lowered, the current value of the LEDs with low color temperature in the first LEDs 211 and the second LEDs 221 can be raised, and meanwhile, the current value of the LEDs with high color temperature is lowered.

Figure 2:
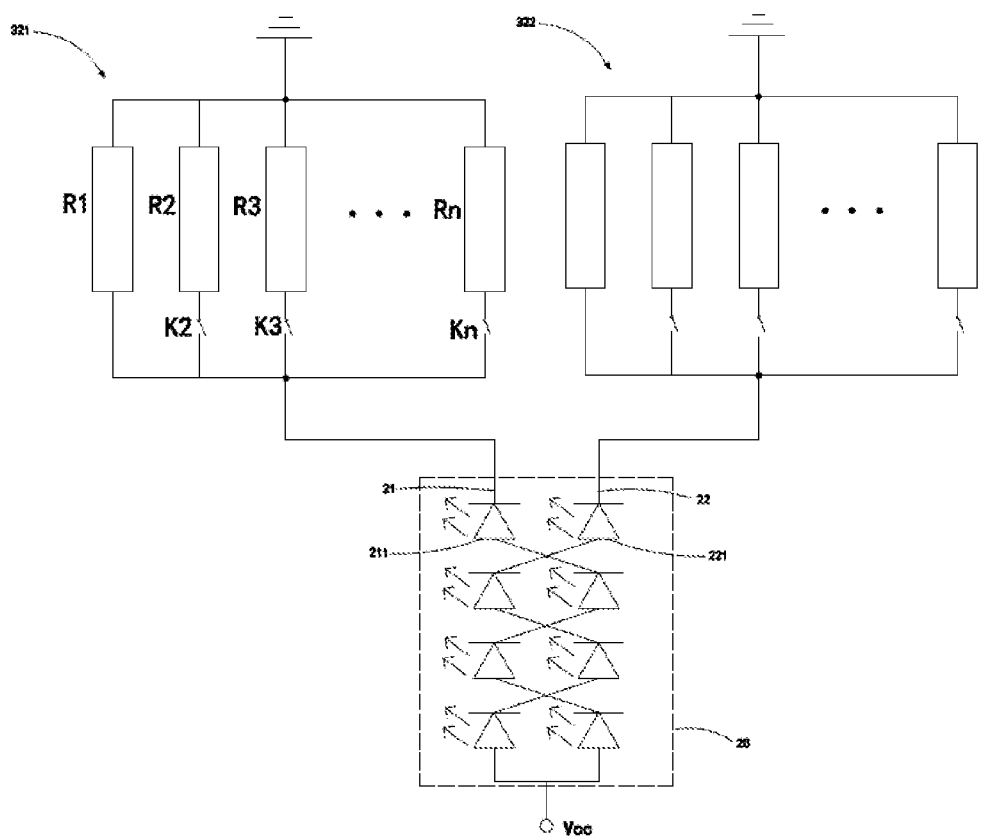
FIG. 2 is a circuit diagram of a first resistance array, a second resistance array and a backlight module of the LED backlight color temperature adjustment circuit shown in FIG. 1.

Specifically, referring to FIG. 2, the first resistance array 321 comprises a plurality of resistances R1-Rn located in parallel, and one end of a parallel circuit consisted of the plurality of resistances R1-Rn is grounded, and the other end is electrically coupled to a cathode of the first LED backlight unit 21; an anode of the first LED backlight unit 21 is electrically coupled to a driving voltage Vcc. It is understood that in other embodiments, one end of the parallel circuit consisted of the resistances R1-Rn is electrically coupled to the driving voltage Vcc, and the other end is electrically coupled to the anode of the first LED backlight unit 21; the cathode of the first LED backlight unit 21 is grounded. The first resistance array 321 further comprises a plurality of electronic switches K2-Kn, and the plurality of electronic switches K2-Kn are respectively coupled to the plurality of resistances R1-Rn in series. The control unit 33 is electrically coupled to the electronic switches K2-Kn (the specific connection route is not shown in figure). The control unit 33 controls on and off of the electronic switches K2-Kn according to the color temperature adjustment signal, and then can correspondingly control the resistance values of the first resistance array 321.

The structure of the second resistance array 322 is roughly the same as the structure of the first resistance array 321; and the connection of the second resistance array 322 with the second LED backlight unit 21 and the control unit 33 is roughly the same as the connection of the first resistance array 321 with the first backlight unit 22 and the control unit 33. Thus, the repeated description is omitted here.

Figure 3:
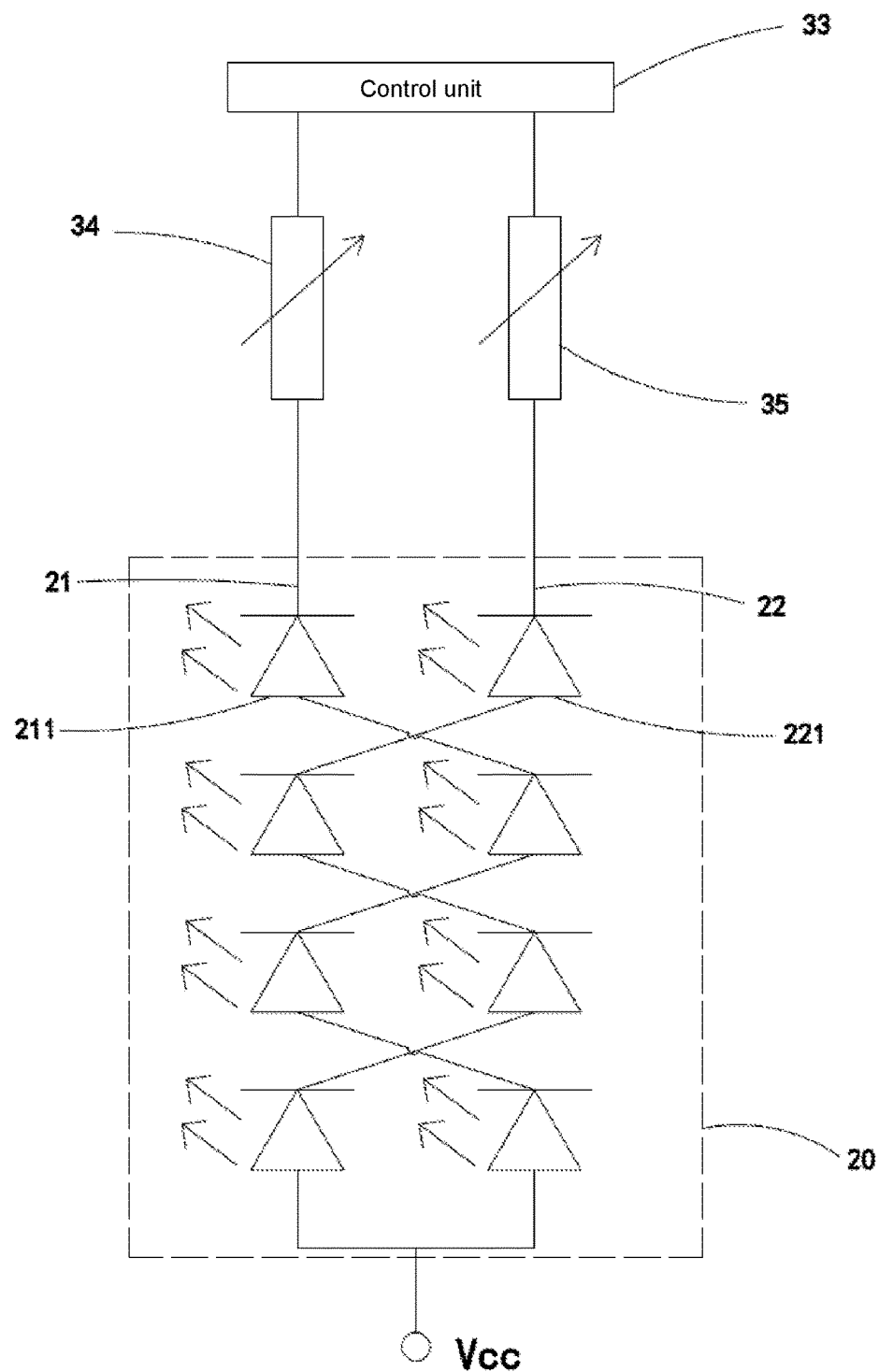
FIG. 3 is a circuit diagram of a control module and an LED backlight module according to another embodiment of the present invention.

It is understood that referring to FIG. 3, in another embodiment of the present invention, the control module 30 can further comprise a first variable resistance 34 and a second variable resistance 36. In this embodiment, the first variable resistance 34 and the second variable resistance 36 respectively replace the first resistance array 321 and the second resistance array 322. The control unit 33 can directly control the resistance values of the first variable resistance 34 and the second variable resistance 36 according to the color temperature adjustment signal, and then can correspondingly adjust the driving currents of the first LEDs 211 and the second LEDs 212.

The LED backlight color temperature adjustment circuit 100 controls the driving currents of the first LEDs 211 and the second LEDs 212 with different color temperatures according to the deviation value of the color temperature of the present display image data and the standard color temperature. The color temperature of the LED backlight module 20 can be adjusted to automatically adjust color temperature as showing the pictures of different color temperatures, and thus to promote the color performance of the display panel.

Above are embodiments of the present invention, which does not limit the scope of the present invention. Any modifications, equivalent replacements or improvements within the spirit and principles of the embodiment described above should be covered by the protected scope of the invention.

What is claimed is:

1. An LED backlight color temperature adjustment circuit, comprising:
   a driving chip, comprising:
   a driving unit, employed to drive a display panel to show an image;
   an image data extraction unit, extracting a present display image data of the display panel;
   an image data analysis unit, employed to determine a color temperature of the present display image data, and to calculate a deviation value of the color temperature of the present display image data and a standard color temperature; and
   a color temperature adjustment unit, employed to generate and output a color temperature adjustment according to the deviation value of the color temperature of the present display image data and the standard color temperature;
   an LED backlight module, comprising:
   a first LED backlight unit, comprising a plurality of first LEDs which are identical and coupled in series; and
   a second LED backlight unit, comprising a plurality of second LEDs which are identical and coupled in series, and a color temperature of the second LEDs is different from a color temperature of the first LEDs;
   a control module, electrically coupled to the driving chip and the LED backlight module, and employed to adjust driving currents of the first LEDs and the second LEDs according to the color temperature adjustment signal for adjusting a color temperature of the LED backlight module.

2. The LED backlight color temperature adjustment circuit according to claim 1, wherein the image data analysis unit calculates a gray scale average value of red sub pixels and a gray scale average value of blue sub pixels in the present display image, and determines the color temperature of the present display image according to the gray scale average value of red sub pixels and the gray scale average value of blue sub pixels.

3. The LED backlight color temperature adjustment circuit according to claim 1, wherein the plurality of first LEDs and the plurality of second LEDs are alternately located and linearly aligned.

4. The LED backlight color temperature adjustment circuit according to claim 3, wherein the plurality of first LEDs and the plurality of second LEDs are aligned in an array, and are alternately located both in a row direction and in a column direction of the array.

5. The LED backlight color temperature adjustment circuit according to claim 4, wherein the control module comprises an I2C interface unit, a programmable resistance array and a control unit; the I2C interface unit is employed to communicate with the driving chip to receive the color temperature adjustment signal; the programmable resistance array comprises a first resistance array and a second resistance array, and the first resistance array and the second resistance array are respectively coupled with the first LED backlight unit and the second LED backlight unit in series;

the control unit is employed to control the values of the first resistance array and the second resistance array according to the color temperature adjustment signal to correspondingly adjust the driving currents of the first LEDs and the second LEDs for correspondingly controlling brightnesses of the first LEDs and the second LEDs.

6. The LED backlight color temperature adjustment circuit according to claim 5, wherein the first resistance array comprises a plurality of resistances located in parallel, and one end of a parallel circuit consisted of the plurality of resistances is grounded, and the other end is electrically coupled to a cathode of the first LED backlight unit; an anode of the first LED backlight unit is electrically coupled to a driving voltage.

7. The LED backlight color temperature adjustment circuit according to claim 4, wherein the control module comprises an I2C interface unit, a first variable resistance, a second variable resistance and a control unit; the I2C interface unit is employed to communicate with the driving chip to receive the color temperature adjustment signal; the first variable resistance and the second variable resistance are respectively coupled to the first LED backlight unit and the second backlight unit in series; the control unit is employed to control resistance values of the first variable resistance and the second variable resistance according to the color temperature adjustment signal to correspondingly adjust the driving currents of the first LEDs and the second LEDs for correspondingly controlling brightnesses of the first LEDs and the second LEDs.

8. The LED backlight color temperature adjustment circuit according to claim 3, wherein the plurality of first LEDs and the plurality of second LEDs are merely aligned in one column.

9. The LED backlight color temperature adjustment circuit according to claim 8, wherein the control module comprises an I2C interface unit, a programmable resistance array and a control unit; the I2C interface unit is employed to communicate with the driving chip to receive the color temperature adjustment signal; the programmable resistance array comprises a first resistance array and a second resistance array, and the first resistance array and the second resistance array are respectively coupled with the first LED backlight unit and the second LED backlight unit in series; the control unit is employed to control the values of the first resistance array and the second resistance array according to the color temperature adjustment signal to correspondingly adjust the driving currents of the first LEDs and the second LEDs for correspondingly controlling brightnesses of the first LEDs and the second LEDs.

10. The LED backlight color temperature adjustment circuit according to claim 1, wherein the image data extraction unit is a buffer.

11. A display device, comprising a display panel, wherein the device further comprises an LED backlight color temperature adjustment circuit, and the LED backlight color temperature adjustment circuit comprises:
a driving chip, comprising:
a driving unit, employed to drive a display panel to show an image;
an image data extraction unit, extracting a present display image data of the display panel;
an image data analysis unit, employed to determine a color temperature of the present display image data, and to calculate a deviation value of the color temperature of the present display image data and a standard color temperature; and
a color temperature adjustment unit, employed to generate and output a color temperature adjustment according to the deviation value of the color temperature of the present display image data and the standard color temperature;
an LED backlight module, comprising:
a first LED backlight unit, comprising a plurality of first LEDs which are identical and coupled in series; and
a second LED backlight unit, comprising a plurality of second LEDs which are identical and coupled in series, and a color temperature of the second LEDs is different from a color temperature of the first LEDs;
a control module, electrically coupled to the driving chip and the LED backlight module, and employed to adjust driving currents of the first LEDs and the second LEDs according to the color temperature adjustment signal for adjusting a color temperature of the LED backlight module.

12. The display device according to claim 11, wherein the image data analysis unit calculates a gray scale average value of red sub pixels and a gray scale average value of blue sub pixels in the present display image, and determines the color temperature of the present display image according to the gray scale average value of red sub pixels and the gray scale average value of blue sub pixels.

13. The display device according to claim 11, wherein the plurality of first LEDs and the plurality of second LEDs are alternately located and linearly aligned.

14. The display device according to claim 13, wherein the plurality of first LEDs and the plurality of second LEDs are aligned in an array, and are alternately located both in a row direction and in a column direction of the array.

15. The display device according to claim 14, wherein the control module comprises an I2C interface unit, a programmable resistance array and a control unit; the I2C interface unit is employed to communicate with the driving chip to receive the color temperature adjustment signal; the programmable resistance array comprises a first resistance array and a second resistance array, and the first resistance array and the second resistance array are respectively coupled with the first LED backlight unit and the second LED backlight unit in series; the control unit is employed to control the values of the first resistance array and the second resistance array according to the color temperature adjustment signal to correspondingly adjust the driving currents of the first LEDs and the second LEDs for correspondingly controlling brightnesses of the first LEDs and the second LEDs.

16. The display device according to claim 15, wherein the first resistance array comprises a plurality of resistances located in parallel, and one end of a parallel circuit consisted of the plurality of resistances is grounded, and the other end is electrically coupled to a cathode of the first LED backlight unit; an anode of the first LED backlight unit is electrically coupled to a driving voltage.

17. The display device according to claim 14, wherein the control module comprises an I2C interface unit, a first variable resistance, a second variable resistance and a control unit; the I2C interface unit is employed to communicate with the driving chip to receive the color temperature adjustment signal; the first variable resistance and the second variable resistance are respectively coupled to the first LED backlight unit and the second backlight unit in series; the control unit is employed to control resistance values of the first variable resistance and the second variable resistance according to the color temperature adjustment signal to correspondingly adjust the driving currents of the first LEDs and the second LEDs for correspondingly controlling brightnesses of the first LEDs and the second LEDs.

18. The display device according to claim 13, wherein the plurality of first LEDs and the plurality of second LEDs are merely aligned in one column.

19. The display device according to claim 18, wherein the control module comprises an I2C interface unit, a programmable resistance array and a control unit; the I2C interface unit is employed to communicate with the driving chip to receive the color temperature adjustment signal; the programmable resistance array comprises a first resistance array and a second resistance array, and the first resistance array and the second resistance array are respectively coupled with the first LED backlight unit and the second LED backlight unit in series; the control unit is employed to control the values of the first resistance array and the second resistance array according to the color temperature adjustment signal to correspondingly adjust the driving currents of the first LEDs and the second LEDs for correspondingly controlling brightnesses of the first LEDs and the second LEDs.

20. The display device according to claim 11, wherein the image data extraction unit is a buffer.

* * * * *